United States Patent [19]

Fuchs

[11] Patent Number: 5,279,455
[45] Date of Patent: Jan. 18, 1994

[54] METHOD OF ATTACHING A METAL ELEMENT TO A METAL SUPPORTING SURFACE BY BRAZING AND APPARATUS FOR ITS IMPLEMENTATION

[75] Inventor: Jean C. Fuchs, L Etrat, France

[73] Assignee: Erico International Corporation, Solon, Ohio

[21] Appl. No.: 923,842

[22] Filed: Jul. 31, 1992

[51] Int. Cl.⁵ .............................................. B23K 35/24
[52] U.S. Cl. ............................ 228/234.3; 228/56.3
[58] Field of Search ................... 228/56.1, 56.3, 51, 228/241, 242

[56] References Cited

U.S. PATENT DOCUMENTS

| | | | |
|---|---|---|---|
| 2,515,191 | 7/1950 | Carpenter et al. | 228/241 |
| 2,999,124 | 9/1961 | Burke | 228/241 |
| 3,020,610 | 2/1962 | Rejdak | 228/241 |
| 3,070,874 | 1/1963 | Davis, Jr. | 228/241 |
| 3,358,356 | 12/1967 | Long . | |
| 4,076,163 | 2/1978 | Grande | 228/56.3 |
| 4,879,452 | 11/1989 | Kovarik et al. | 228/241 |
| 4,881,677 | 11/1989 | Amos et al. | 228/241 |
| 4,885,452 | 12/1989 | Amos et al. | 228/241 |
| 5,145,106 | 9/1992 | Moore et al. | 228/241 |

FOREIGN PATENT DOCUMENTS

| | | |
|---|---|---|
| 0174285 | 6/1985 | European Pat. Off. . |
| 1016096 | 1/1956 | Fed. Rep. of Germany . |
| 2657283 | 1/1990 | France . |
| 2065528 | 7/1981 | United Kingdom ................ 228/241 |

Primary Examiner—Paula A. Bradley
Assistant Examiner—Chuck Y. Mah
Attorney, Agent, or Firm—Renner, Otto, Boisselle & Sklar

[57] ABSTRACT

A method of forming a low profile brazing connection utilizes the heat from an exothermic or metallothermic reaction which takes place in a vessel having a wall of a thickness and material to radiate the heat of the reaction therethrough while nonetheless containing the reaction. The conductor or conductor lug has a flat surface and the apparatus in at least two embodiments provides for pressing the vessel and thus the flat surface against the conductor and the conductor in turn against the structure to which it is brazed. The vessel and its contents may be discarded after brazing.

13 Claims, 2 Drawing Sheets

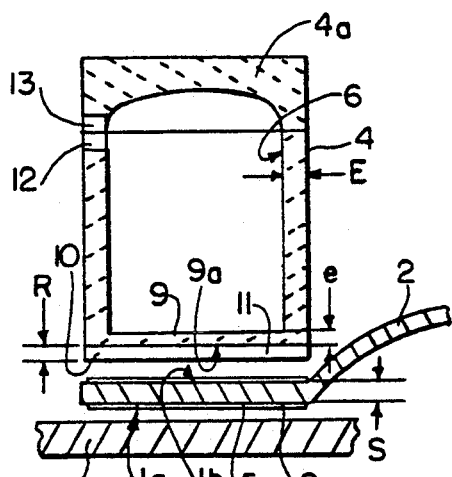
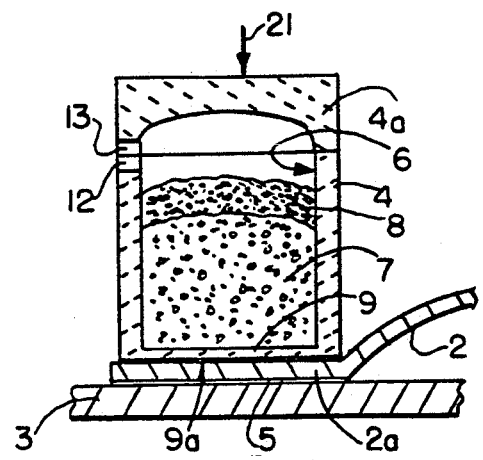
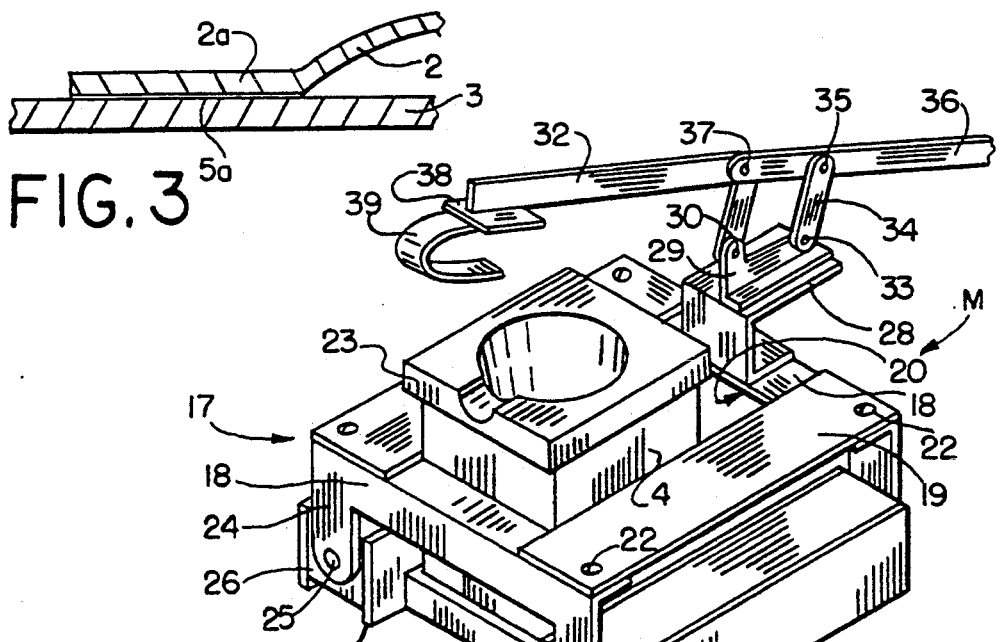
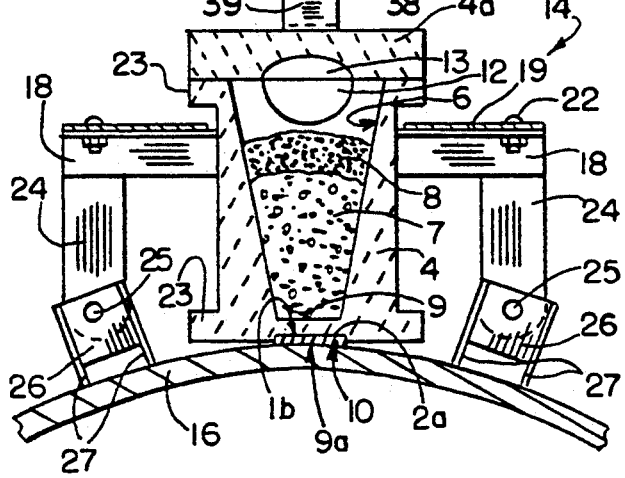
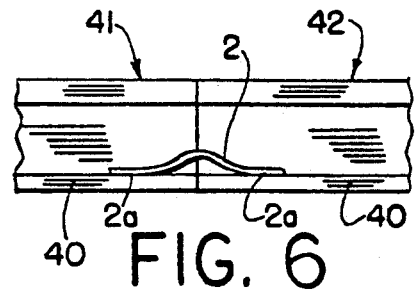
FIG. 1   FIG. 2   FIG. 3   FIG. 4   FIG. 5   FIG. 6

METHOD OF ATTACHING A METAL ELEMENT TO A METAL SUPPORTING SURFACE BY BRAZING AND APPARATUS FOR ITS IMPLEMENTATION

DISCLOSURE

This invention relates to a method of attaching a metal element by brazing, such as the end of a wire braid, cable or other jumper or conductor, or the lug end of such, to another surface, such as a tube, a pipe, rail or other element, normally made up of a different metal.

BACKGROUND OF THE INVENTION

Presently, after grinding the receiving surface and depositing a fluxing element, the aforesaid attachment by brazing is performed by placing the element to be brazed on the supporting surface. Then by increasing the temperature of the receiving supporting surface and of the element to be brazed, normally by means of an oxyacetylene blowpipe, the elevated temperature of the elements allows the melted brazing material to flow between the element and supporting surface by capillary action.

This well known and well mastered technique of attachment requires an oxyacetylene unit comprising two bottles, a welding regulator, some pipes and a blowpipe, such unit being voluminous and bulky and it cannot always be transported to work on an outside or field site. Moreover, under certain conditions, and for instance when the supporting surface is solid and a high heat conductor, or when it carries a fluid causing the dissipation of calories, the thermal energy supplied by an oxyacetylene blowpipe is insufficient to bring the supporting surface to the required brazing melting temperature.

This invention aims at eliminating these disadvantages by offering a method of brazing in situ which replaces the calorific supply delivered by the heavy, bulky oxyacetylene unit, such equipment requiring an experience and skill to carry out a good brazing, with a calorific supply produced by a metallothermic reaction.

A method is also known and described in German patent 9825391, to connect two wire conductors end to end consisting, on the one hand, in surrounding the attachment zone with a cartridge containing a metallothermic mixture and, on the other hand, in crushing these melted zones one against the other when the exothermic reaction causes a melting of the wire conductors ends. Such technique, which requires the local melting of the elements to be assembled, requires a large quantity of metallothermic mixture to reach the calorific power necessary for melting. Such method also requires the handling of the elements during the exothermic reaction in order to join them and to reach the compression necessary for their attachment. Thus, such method cannot be applied to the attachment of a conducting wire or jumper on a bulky supporting surface by brazing, and it cannot be applied on an outside site not provided with mechanical means to ensure the compression of the melted zones.

A brazing technique on the site is known and described in German patent 1016096. It consists in attaching a terminal previously placed on a wire conductor on a supporting surface by melting a brazing, said brazing being included in an arrangement of the terminal by means of a metallothermic reaction carried out in a crucible, the wall thereof comprising an opening adapted to the terminal and allowing the direct contact of said terminal with the mixture and the metallothermic reaction.

For such method a special terminal is required for the wire conductor and, after the reaction ensuring the brazing on the site, the crucible has to be withdrawn to disengage the melted metal mass resulting from the reaction and connected to the terminal. This metal mass which does not cooperate with the attachment of the terminal on the supporting surface, forms a protuberance removable only with a file, due to the fact that such melting connection to the back terminal is more resistant than the attachment by brazing of the terminal on the receiver. Such method cannot be used to attach the end of an electric wire conductor or jumper to a metal tube or to any other supporting surface as the proturberance is inconvenient for the installation of a protecting envelope on the connecting zone. Also handling the aforesaid protuberance causes the brazed zone to be caught, and the quality may be altered. Moreover, the positioning of the crucible on the terminal, the latter resting on the supporting surface, requires a particular attention to obtain a good brazing and also requires to provide for different crucibles, whenever the terminal is differently oriented in relation to the supporting surface, or whenever the supporting surface is differently positioned in relation to the vertical plane.

Another brazing technique is shown in French patent publication 2657283 utilizing a metal cup with the attached wire or cable extending into the cup through a hole in the wall. A crucible on top of the cup contains exothermic weld metal which when ignited flows into the cup. The heat from the weld metal provides heat through the bottom wall of the cup to braze the cup to a support surface. The connection provided is bulky, having a substantial protuberance, and is expensive.

SUMMARY OF THE INVENTION

The present invention aims at eliminating these disadvantages by offering a method of brazing on the site which utilizes the calorific supply of a metallothermic reaction, without using the obtained mixture for the attachment, said method being simple to implement, applicable whatever the position of the supporting surface, horizontal or vertical, or whatever the relative disposition of the attached element is. The method results in no protuberance on the brazed zone while requiring no cleaning, trimming or grinding after the reaction.

The method according to the invention consists in: providing the portion to be brazed, which is part of the metal element to be attached to the supporting surface, with a flattened cross section having two large opposite surfaces or faces; impregnating with brazing material at least one of the two large opposite faces of said portion; pressing this brazing impregnated face against a face of the supporting surface, prepared for the brazing operation; and pressing a crucible against the other large face of the portion to be brazed, the crucible also comprising a positioning arrangement for the portion of the element. The portion of the crucible coming into contact with such face has a thickness such that it makes it permeable to the calorific supply resulting from the metallothermic reaction in the crucible, such portion being nonetheless a barrier containing the melted mixture resulting from this reaction. After initiating the reaction in the crucible and cooling down, the crucible containing the melted mixture is withdrawn and discarded.

During the metallothermic reaction, the thermal energy is transmitted to the portion to be brazed which is pressed against said wall, through the heat permeable wall at the bottom of the crucible, and rapidly causes the brazing to melt. Once the crucible has been withdrawn, the brazed portion does not exceed its thickness and thus it cannot be caught when handling its supporting surface.

A high quality and consistent brazed connection is obtained because of a number of factors. These include the large surfaces of interchange between the crucible bottom, the element and the supporting surface. Also, the proportioning and selection of the metallothermic mixture, and the selection of the thermal permeable material of the crucible, as well as its thickness, all enable good uniform results to be obtained, whether the process or apparatus is used in the workshop or on the site.

The invention also relates to apparatus for implementing such method. This apparatus is of the type utilizing a crucible and holding means, attached to the supporting surface on which a metal element has to be brazed, and transmitting to the crucible an effort or force towards the supporting surface.

In the apparatus according to the invention, the crucible includes only one chamber to receive the metallothermic mixture and the ignition mixture. This chamber comprises a wall, permeable to the heat energy of the metallothermic reaction, said wall comprising a face which comes to rest directly on the face opposite to the portion to be brazed on the supporting surface, and may also include a space or slot positioning the portion to be brazed with at least one perpendicular edge or face.

The crucible is mounted in the holding means for movement following a direction nearly perpendicular to its permeable wall, the holding means comprising removable means which, in brazing position, can rest on the crucible to press the same exclusively against the portion to be brazed.

Thanks to the float mounting of the crucible in the holding means on the supporting surface, the thinner wall of the crucible is properly pressed against the portion to be brazed and it in turn presses this portion against the supporting surface. The result is that the faces of the element to be brazed are uniformly kept in contact with the opposite walls, each face forming a large surface.

In one embodiment of the invention, the crucible comprises an open cup-shaped arrangement, associated to a covering cap, made up of a refractory or other material resisting and containing the exothermic reaction, which contains one dose of metallothermic mixture and one dose of an ignition mixture. This arrangement has a means to position the element to be brazed and a wall permeable to thermal energy. It can be used only once and thus, after use, it is discarded at the same time as the melted mixture it contains.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings:

FIG. 1 is a vertical section showing the various elements implemented by the method of brazing on the site;

FIG. 2 is a vertical section showing the same elements during the brazing phase;

FIG. 3 is a vertical section showing the two elements connected by brazing;

FIG. 4 is a perspective view showing an embodiment of the device for the application of the method to the brazing of a cylindric body;

FIG. 5 is a section of the apparatus of FIG. 4 showing the apparatus before initiating the exothermic reaction;

FIG. 6 is a side front view showing, at reduced scale, the application of the method and apparatus to the brazing of the ends of a connecting wire or jumper between two rails;

DETAILED DESCRIPTION OF THE PREFERRED EMBODIMENTS

Figure 7:
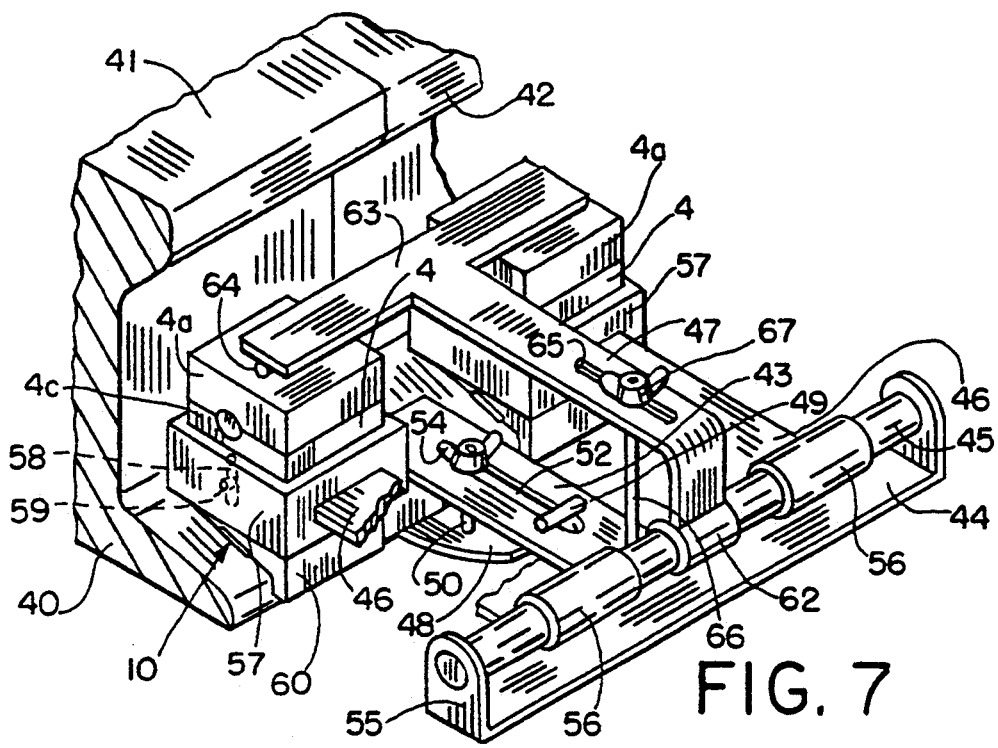
FIG. 7 is a perspective view of the apparatus for the performance of the brazing of the conductor ends of FIG. 6.
Figure 8:
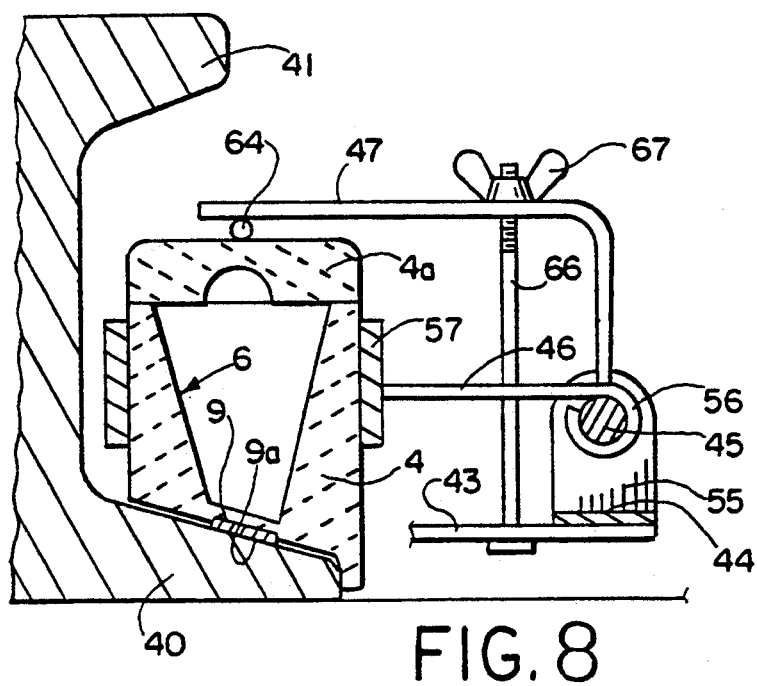
FIG. 8 is a partial crossview of the device shown in FIG. 7 through the median plan of a crucible.

As described in the preamble, this method of brazing a metal element 2 on a metal supporting surface 3 of a different nature, on the site, involves a crucible 4. The element 2 may be a metal cable, a metal braiding, a stacking or lamination of metal strips, insulated or not, but also a metal foil used for attachment or hanging. Regarding the supporting surface 3, it may be a metal sheet, as shown in FIGS. 1–3, a tubular ferrule, as shown in FIG. 5, a rail skid or flange, as shown in FIGS. 6–8, or any portion made up of metal or metal alloy unable to stand a too high temperature, for example, in order to avoid a selective hardening or a decarburization. The attachment may be performed between horizontal and vertical surfaces or between surfaces in any other intermediate position.

According to the invention, the portion 2a of the element 2 to be brazed on the supporting surface 3, and e.g. the end of a multi-foil conductor, a braid or a stranded conductor, is first conformed to provide a flattened cross section with two large opposite faces 1a–1b, and for example a rectangular cross section, if said section is not already formed. After this operation, the portion 2a is cleaned and impregnated with a brazing 5 at least on its surface 1a which must be in contact with the supporting surface 3. After preparing the surface of the supporting face 3, and for example after grinding and depositing a fluxing agent, the face 1a of the portion 2a is put on the surface, and then the crucible 4 is installed on face 1b.

This crucible made up of graphite or any other refractory in purpose material, as will be discussed further, is different from conventional crucibles due to the fact that it includes only one internal chamber 6 intended to receive one dose of pulverulent mixture 7, of metal oxides, with one dose 8 of an ignition mixture, and that it comprises a wall permeable to the heat supply of the metallothermic reaction, such wall, in this embodiment, comprising a bottom 9 whose local thickness e is lower than thickness E of the other walls. In another alternative it may also have the same thickness. The bottom external surface 9a is one of the faces of a groove 10 positioning the portion 2a with at least one perpendicular face 11.

As shown in FIG. 5, the aforesaid arrangement may be a longitudinal groove going right through the bottom wall of the crucible. The deepness R of this arrangement or groove is smaller than the thickness S of portion 2a, so that in no case the lower end of the crucible 4 comes into contact with the supporting surface 3. The crucible is associated with holding means, generally shown at M (FIG. 4) which exercise a thrust on the crucible in the direction of the arrow 21 in FIG. 2, such thrust pressing the face 9a against the upper face 1b of the element 2a, and in turn pressing the face 1a of this element against the supporting surface 3.

As it is known, this crucible is associated to the covering cap 4a. The ignition channels, respectively 12 and 13, locally go through the crucible peripheral wall and the covering cap wall, thus allowing sparks generated outside by an ignitor or by any other means, to get into the chamber 6 of the crucible to initiate the ignition mixture 8.

The exothermic reaction generated by the ignition of the metallothermic mixture is preferably transmitted through the permeable wall of the bottom 9, and, consequently, it is transmitted to the portion 2a and therefrom to the supporting surface 3. Due to the large surfaces in contact between the bottom 9, the portion 2a and the supporting surface 3, the thermal energy irradiates the whole surfaces present and rapidly causes a melting of the brazing 5 which impregnates face 1a of the portion 2a.

After cooling down, the whole crucible 4 is withdrawn. The bottom 9 has acted as a screen and prevented the mass of melted metal, contained in the chamber 6, from coming into contact with the portion 2a. As shown in FIG. 3, after extraction of the crucible 4, the portion 2a is properly electrically attached to the supporting surface 3, by a layer of homogeneous brazing 5a, and the connection has no protuberance. The melted mixture solidifies inside the crucible 4 and after stripping it is discarded.

It is easy to understand that this mode of attachment may abe applied to ensure the attachment of any metal element on any metal supporting surface, without having to use means other than the crucible holding means which ensure at the same time the positioning of the brazed element on the supporting surface. The crucible 4 may be made of ceramics, or of any other refractory material. It may also comprise an arrangement made up of a material resisting at least one exothermic reaction and, for example it may comprise a metal cup and particularly an aluminum cup. Under these conditions, the cup is discarded after use, at the same time as the melted mixture it contains. This solution considerably extends the field of application of the method of brazing on the site according to the invention.

The embodiment of holding means M, shown in FIGS. 4 and 5, intends to ensure the holding of the crucible 4 in relation to a tubular body, such as a tube intended to carry a gas or a fluid. The chassis of these holding means comprises a frame, generally shown at 17, and comprises two cross angles 18 and two longitudinal bars 19, forming a central opening 20. The general section of the opening is similar to the section of the body of the crucible 4. Nevertheless, its dimensions are sufficient to tolerate the vertical displacements of the crucible in relation to the frame 17. The bars 19 are attached to the angles 18 by means of the screws 22 or by any equivalent means allowing the dismounting of one of these bars to introduce the crucible 4 into the frame 17. At both extremities, the crucible 4 is fitted with flanges 23 surrounding it and forming stops which limit the vertical travel of said crucible.

The cross angles 18 are formed with the vertical ears or legs 24, extending downward and at both extremities. The opposite ears act as bearings for the longitudinal spindles or axles 25, installed parallel to the longitudinal axis of the crucible 4 and, more precisely, parallel to the longitudinal axis of the groove 10, located in the lower face of the crucible, as shown in FIG. 5.

On each axle 25, a magnetic bar 26 is articulated and has secured thereto plates 27, by means of screws, not shown, said plates projecting vertically lower than such bar, their lower edges becoming the bearing surfaces on the cylindrical surface of the body 16.

As shown in FIG. 4, the cross angle 18, opposite to the ignition channel 12 of the crucible 4, has attached thereto a console or bracket 28 which includes a leg 29 on which at pivot 30, a bearing lever 32, and at pivot 33, a connecting rod or link 34, are articulated. The rod or link 34 is also pivoted at 35 to an actuating lever 36. The lever 36 is pivoted at 37 on the bend of the lever 32, while, at its front end, the lever 32 is fitted with a plate 38 on which a means of flexible compression is attached, such as a curved spring blade 39. The spring is depressed by pressing down on lever 36 and when pivot 35 goes over center between pivots 33 and 37, the toggle action holds the spring depressed.

Of course, the device previously described to ensure the compression of the crucible on the portion 2a to be brazed may be replaced by any other equivalent means, exercising an elastic compression towards the bottom 9. To ensure the brazing on the site with these holding means, first of all, said means must be positioned on the cylindrical body 16 by means of the magnetic bars 26 on both sides of the surface prepared on this body, while checking the right contact of the blades 27 with the said cylindrical body to reach a good magnetic attachment. Once the portion 2a to be brazed has been fitted in the groove 10 of the crucible, the internal chamber 6 of the crucible 4 is filled with metallothermic mixture and ignition mixture, the cover 4a is installed, the lever 36 actuated so that the elastic blade 39 comes and rests on the cover 4a, pressing the face 9a of the groove against the face 1b of the portion 2a to be brazed, and lastly, the ignition of the metallothermic reaction is initiated.

It should be noted that these various operations are very easily and rapidly performed, and that with these holding means, the portion 2a showing the brazing impregnated face 1a is properly positioned in relation to the crucible bottom, and properly maintained between said crucible and the body 16.

After cooling, namely after a time sufficient to allow the melted brazing to cool down, but sufficient also to allow the manual grip of the holding means whose temperature increased as a result of the exothermic reaction, these holding means are extracted from the body 16. After actuating the lever 36, to release the crucible cover, the solidified mixture which provoked the reaction is withdrawn from the crucible.

It is to be noted that the rapidity of the exothermic reaction and, consequently, the rapidity of the heat transfer to the portion 2a to be brazed, associated with a proper blending and dosing condition to obtain a determined thermal energy, allows the process to attach by brazing a metal element on a tubular body 16 carrying a fluid which tends to dissipate the calories coming from the outside.

The holding device represented in FIGS. 7 and 8 is intended to implement the method to attach both ends 2a of a wire conductor, braid or jumper 2 by brazing on the skids or bottom flange 40 of two rails 41-42 joined end to end as shown in FIG. 6. Such holding means comprise a crosspiece 43, a bar 44, bearing a cylindrical spindle 45, with at least one and preferably two holding levers 46 and a bearing lever 47. In FIG. 7 the left hand lever 46 is shown broken away.

At its free end, the crosspiece 43 is fitted with means of attachment on the skids or flange 10. In this embodiment, these means comprise one clip whose jaws are formed by the crosspiece itself and by a clip 48 articulated on the crosspiece at 49 and which runs under the rail skid or flange. This clip is connected to the crosspiece by a clamping means comprising a threaded rod 50 going through a slot 52 in the crosspiece and receiving, on its threaded end, an adjusting nut 54. Usually, such clip is installed in such a way that it overlaps the vertical joint plane between the two rails 41 and 42.

The longitudinal bar 44 which is attached approximately in its middle portion on the outer end of the crosspiece 43, is placed parallel to the longitudinal axis of the rails, and by means of the two bearings 55, supports cylindrical spindle or hinge pin 45 parallel to said longitudinal bar 44. Each lever 46, fitted with a journal 56 articulated on the spindle 45, is made part of or secured to the frame 57 which holds the crucible 4, at its free end. Like the previous embodiment, the crucible 4 is mounted free in vertical translation in the frame 57 with a limited travel. For this reason, the crucible includes an oblong vertical slot 58, open in at least one of the side faces 4c of said crucible, within which the end of a finger 59 screwed in the frame 57 may freely slide.

FIG. 8 shows that the bottom 9 and the face 9a of the crucible are inclined, in order to be parallel to the upper face of the rail flange 40, and that the crucible comprises a heel 60 extending downward and, when the edge of the flange 40 is pressed, the heel becomes a means of cross positioning the crucible 4 and holding the apparatus transversely in relation to the rails 41-42.

The bearing lever 47 is bent and articulated on spindle 45 by means of a journal 62. At the opposite or free end the lever 47 has a longitudinal bar 63 stretching out above the covers 4a of the crucibles 4. At both ends round rods 64 are welded to the lower face. Between its articulation on the shaft 45 and the bar 63, the lever 47 includes a slot 65 through which extends the threaded extremity of rod 66, the head of which engages the crosspiece 43 (FIG. 8). A nut 67, screwed on the end of the threaded rod 6, bears against the lever 47.

The utilization of these means requires a consistent preplacing, after the implementation of the crosspiece 43 of the joint plane of the two rails 41-42, to rotate the levers 46, until the crucibles 4 rest on the rail flange, then to push horizontally toward the rail the holding means, until the heels 60 of the crucibles are in contact with the external edges of the flanges 40 of the two rails. At this phase, the nut 54 of the clip 48 is tightened and the device is thus firmly secured to both rails.

Then the conductor 2 is placed, the levers 46 being rotated away from the rails to allow the introduction of the conductor between the two crucibles. Then the ends 2a of the conductor are placed into the grooves 10 of the crucibles. Once the crucibles are filled with the suitable mixture and once the covers are installed, the lever 47, hitherto in retracted position, is tilted, until its bearing clamps 64 come into contact with the covers. Then the lever is tightened by means of the nut 67. The ignition of both crucibles may be carried out separately or simultaneously, should their ignition channels be located opposite. As in the previous embodiments, after cooling the holding means are separated from the rails.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. Apparatus for brazing a metal element having a brazing surface and an opposite face surface on a metal support surface utilizing a metallothermic reaction to supply the heat necessary to melt brazing material between the element brazing surface and the metal support surface, a movable crucible adapted to contain a metallothermic reaction mixture and the products of the reaction, and having a heat transmitting wall adapted to mate with the opposite face surface of the metal element, and holding means for supporting said crucible with respect to the metal support surface and metal element whereby said heat transmitting wall is in engagement with the opposite face surface of the metal element and the brazing surface is against the metal support surface, said holding means including means for pressing the crucible and thus said heat transmitting wall against the opposite face surface of the metal element and in turn the brazing surface against the metal support surface, whereby when said metallothermic reaction is initiated, the heat from said reaction will be transmitted through said heat transmitting wall and said metal element to melt the brazing material to braze the element to the support surface.

2. Apparatus as set forth in claim 1 including a shoulder on said crucible to assist in locating the crucible and metal element with respect to each other.

3. Apparatus as set forth in claim 2 wherein said shoulder is part of a groove into which said metal element fits.

4. Apparatus as set forth in claim 1 wherein said movable crucible is disposable and contains a single dose of metallothermic reaction mixture.

5. Apparatus as set forth in claim 1 wherein said holding means comprises magnetic bars.

6. Apparatus as set forth in claim 1 wherein said means for pressing comprises toggle lever means.

7. Apparatus as set forth in claim 1 wherein said crucible has upper and lower ends, and flanges on said ends, and said holding means includes an opening within which said crucible can travel, said flanges forming stops to engage the holding means at the opening to limit such travel of the crucible.

8. Apparatus as set forth in claim 1 wherein said metal support surface is longitudinally elongated, and said holding means includes a crosspiece extending transversely of the metal support surface having an inner and outer end, an attachment clip on said inner end for securing said crosspiece to said support surface, a spindle supported at the outer end of said crosspiece and extending generally parallel to the metal support surface, at least one holding lever pivoted on said spindle for holding said crucible, and a bearing lever also pivoted on said spindle to bear on said crucible to press the crucible against said metal element.

9. Apparatus as set forth in claim 8 including means for elastic tightening of said bearing element to control the pressure on said crucible.

10. Apparatus as set forth in claim 8 including two holding levers pivoted on said spindle, each holding a crucible, said bearing lever including a bar spanning said crucibles whereby each end of the bar will bear upon one of said crucibles.

11. Apparatus as set forth in claim 1 including means to regulate the temperature transmitted to the brazing material by modifying the thickness of the heat transmitting wall.

12. Apparatus as set forth in claim 1 including means to regulate the temperature transmitted to the brazing material by modifying the material of the heat transmitting wall.

13. Apparatus as set forth in claim 1 including means to regulate the temperature transmitted to the brazing material by modifying the metallothermic reaction.

* * * * *